United States Patent
Kamela et al.

(10) Patent No.: US 11,109,115 B2
(45) Date of Patent: Aug. 31, 2021

(54) INSERTING ADVERTISEMENTS IN ATSC CONTENT

(71) Applicant: AT&T Intellectual Property I, L.P., Atlanta, GA (US)

(72) Inventors: Przemyslaw Kamela, Westminster, CA (US); Sonali Behera, Bengaluru (IN); Rajesh Krishna, Cerritos, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 43 days.

(21) Appl. No.: 16/182,313

(22) Filed: Nov. 6, 2018

(65) Prior Publication Data

US 2020/0145728 A1    May 7, 2020

(51) Int. Cl.
| | |
|---|---|
| *H04N 7/10* | (2006.01) |
| *H04N 21/81* | (2011.01) |
| *G06Q 30/02* | (2012.01) |
| *H04N 21/44* | (2011.01) |
| *H04N 21/84* | (2011.01) |
| *H04N 21/472* | (2011.01) |
| *H04N 21/643* | (2011.01) |
| *H04N 21/858* | (2011.01) |

(52) U.S. Cl.
CPC ....... *H04N 21/812* (2013.01); *G06Q 30/0272* (2013.01); *H04N 21/44016* (2013.01); *H04N 21/47217* (2013.01); *H04N 21/643* (2013.01); *H04N 21/84* (2013.01); *H04N 21/8586* (2013.01)

(58) Field of Classification Search
CPC ........... H04N 21/812; H04N 21/44016; H04N 21/47217; H04N 21/643; H04N 21/8586; H04N 21/84; H04N 21/85406; H04N 21/26258; H04N 21/8456; H04N 21/6582; H04N 21/44204; H04N 21/8455; G06Q 30/0272
USPC .......................................................... 725/32
See application file for complete search history.

(56) References Cited

U.S. PATENT DOCUMENTS

| | | | |
|---|---|---|---|
| 7,231,411 B1 * | 6/2007 | Lu | H04N 21/418 |
| 7,418,059 B2 * | 8/2008 | Lee | H04N 21/4143 375/316 |
| 8,108,893 B2 | 1/2012 | Haberman et al. | |
| 8,327,399 B2 | 12/2012 | Noll et al. | |
| 8,370,198 B2 | 2/2013 | Gupta et al. | |
| 8,670,652 B2 | 3/2014 | Yai et al. | |

(Continued)

FOREIGN PATENT DOCUMENTS

KR    20030093372 A    12/2003

*Primary Examiner* — Jefferey F Harold
*Assistant Examiner* — Sahar Aqil Riaz
(74) *Attorney, Agent, or Firm* — Guntin & Gust, PLC; Jay Anderson (57) ABSTRACT

In one embodiment, a method includes receiving, by a device, playback content. The playback content is associated with an ATSC signal. The method also includes identifying, by the device, one or more markers in the playback content, communicating, by the device, information associated with the one or more markers to an advertisement decision engine, and receiving, by the device, a URL for an addressable targeted programmatic advertisement from the advertisement decision engine. The method further includes inserting, by the device, the addressable targeted programmatic advertisement URL into the playback content.

20 Claims, 5 Drawing Sheets

(56) References Cited

U.S. PATENT DOCUMENTS

| | | | |
|---|---|---|---|
| 8,799,943 B1 | 8/2014 | Sherwin et al. | |
| 8,825,499 B2 | 9/2014 | Jajodia et al. | |
| 8,863,177 B2 | 10/2014 | Cha et al. | |
| 8,997,142 B2 | 3/2015 | Agarwal et al. | |
| 9,021,521 B2 | 4/2015 | Debois et al. | |
| 9,319,730 B2 | 4/2016 | Krasko et al. | |
| 9,479,801 B2 | 10/2016 | Higgs et al. | |
| 9,832,494 B2 | 11/2017 | Miller et al. | |
| 9,860,579 B2 | 1/2018 | Small et al. | |
| 9,973,830 B1 * | 5/2018 | Shetty | H04N 21/23439 |
| 2004/0046897 A1 | 3/2004 | Kitatora et al. | |
| 2006/0035610 A1 * | 2/2006 | Potrebic | H04N 21/4263 |
| | | | 455/178.1 |
| 2006/0075449 A1 | 4/2006 | Jagadeesan et al. | |
| 2007/0033633 A1 | 2/2007 | Andrews et al. | |
| 2007/0143787 A1 | 6/2007 | Cankaya | |
| 2007/0223663 A1 | 9/2007 | Benco et al. | |
| 2007/0283384 A1 | 12/2007 | Haeuser et al. | |
| 2008/0040742 A1 | 2/2008 | Howcroft et al. | |
| 2011/0202270 A1 | 8/2011 | Sharma et al. | |
| 2012/0042335 A1 | 2/2012 | Hwang et al. | |
| 2013/0276017 A1 * | 10/2013 | Walker | H04N 21/2407 |
| | | | 725/25 |
| 2014/0074618 A1 | 3/2014 | Agarwal | |
| 2014/0282699 A1 | 9/2014 | Fertig et al. | |
| 2015/0026724 A1 | 1/2015 | Alder et al. | |
| 2015/0325268 A1 * | 11/2015 | Berger | H04N 21/44204 |
| | | | 386/248 |
| 2016/0182923 A1 * | 6/2016 | Higgs | H04N 21/23424 |
| | | | 725/34 |
| 2016/0182973 A1 * | 6/2016 | Winograd | H04N 21/262 |
| | | | 725/25 |
| 2016/0224192 A1 * | 8/2016 | Carr | G06F 9/452 |
| 2018/0288468 A1 * | 10/2018 | Yamagishi | H04N 21/434 |
| 2019/0066153 A1 * | 2/2019 | Netter | H04L 67/22 |
| 2019/0098344 A1 * | 3/2019 | Shanson | H04L 65/601 |
| 2019/0174203 A1 * | 6/2019 | Suresh | H04N 21/4334 |

* cited by examiner

INSERTING ADVERTISEMENTS IN ATSC CONTENT

TECHNICAL FIELD

This disclosure generally relates to Advanced Television Systems Committee (ATSC) content, and more specifically to inserting advertisements into ATSC content.

BACKGROUND

In Over-the-Air programming (OTA), a television signal may be transmitted by radio waves from a terrestrial (i.e., Earth-based) transmitter of a television station to a television receiver having an antenna. Local channels are broadcasted from the local television station tower over the air. OTA users may install antennas to capture the OTA radio signals, which may enable the OTA users to view OTA content on their television sets.

SUMMARY

According to an embodiment, a method includes receiving, by a device, playback content. The playback content is associated with an ATSC signal. The method also includes identifying, by the device, one or more markers in the playback content, communicating, by the device, information associated with the one or more markers to an advertisement decision engine, and receiving, by the device, a Uniform Resource Locators (URL) for an addressable targeted programmatic advertisement from the advertisement decision engine. The method further includes inserting, by the device, the addressable targeted programmatic advertisement URL into the playback content.

According to another embodiment, a system includes one or more processors and a memory storing instructions that, when executed by the one or more processors, cause the one or more processors to perform operations including receiving, by a device, playback content. The playback content is associated with an ATSC signal. The operations also include identifying, by the device, one or more markers in the playback content, communicating, by the device, information associated with the one or more markers to an advertisement decision engine, and receiving, by the device, a URL for an addressable targeted programmatic advertisement from the advertisement decision engine. The operations further include inserting, by the device, the addressable targeted programmatic advertisement URL into the playback content.

According to yet another embodiment, one or more computer-readable storage media embody instructions that, when executed by a processor, cause the processor to perform operations including receiving, by a device, playback content. The playback content is associated with an ATSC signal. The operations also include identifying, by the device, one or more markers in the playback content, communicating, by the device, information associated with the one or more markers to an advertisement decision engine, and receiving, by the device, a URL for an addressable targeted programmatic advertisement from the advertisement decision engine. The operations further include inserting, by the device, the addressable targeted programmatic advertisement URL into the playback content.

Technical advantages of this disclosure may include one or more of the following. A device inserts addressable targeted programmatic advertisements into ATSC 3.0 content during the time a receiver of the device is buffering incoming packets, which provides a viewer a seamless experience when viewing the manipulated ATSC 3.0 content. Inserting addressable targeted programmatic advertisements into ATSC 3.0 content that is delivered to devices such as televisions and mobile phones may increase the device user's viewing experience since the advertisements are targeted to the user based on various criteria such as the device user's location, age, income, interests, buying habits, and so on. Seamless advertisement insertion into the device user's viewing session may also increase advertising revenue. Methods and systems of this disclosure eliminate the need for a separate player for advertisements and playback content.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

ATSC is a committee that developed standards for terrestrial/broadcast television in the United States. ATSC 3.0 is a recent version of the ATSC standards for television broadcasting that offers features such as high resolution, mobile television support, targeted advertisements, emergency alerts, and the like. ATSC 3.0 combines both broadcast transmission and broadband delivery. Currently, ATSC 3.0 does not have the ability to target demographic-based advertisements to subscribers of ATSC 3.0 content based on criteria such as gender, income, habits (e.g., spending habits), product affinity, and so forth. All customers in the same localized broadcast zone currently view the same advertisements.

Certain embodiments of this disclosure insert addressable targeted programmatic advertisements into ATSC 3.0 broadcast content based on criteria specific to a viewer of the ATSC 3.0 broadcast content. A manifest manipulator, which may be included in a device used to play broadcast content, receives an ATSC 3.0 signal, identifies SCTE-35 markers within the broadcast content, requests advertisements targeted to the device user from an advertisement decision engine, receives addressable targeted programmatic advertisements from the advertisement decision engine, and inserts the addressable targeted programmatic advertisements before playback to the user.

Figure 1:
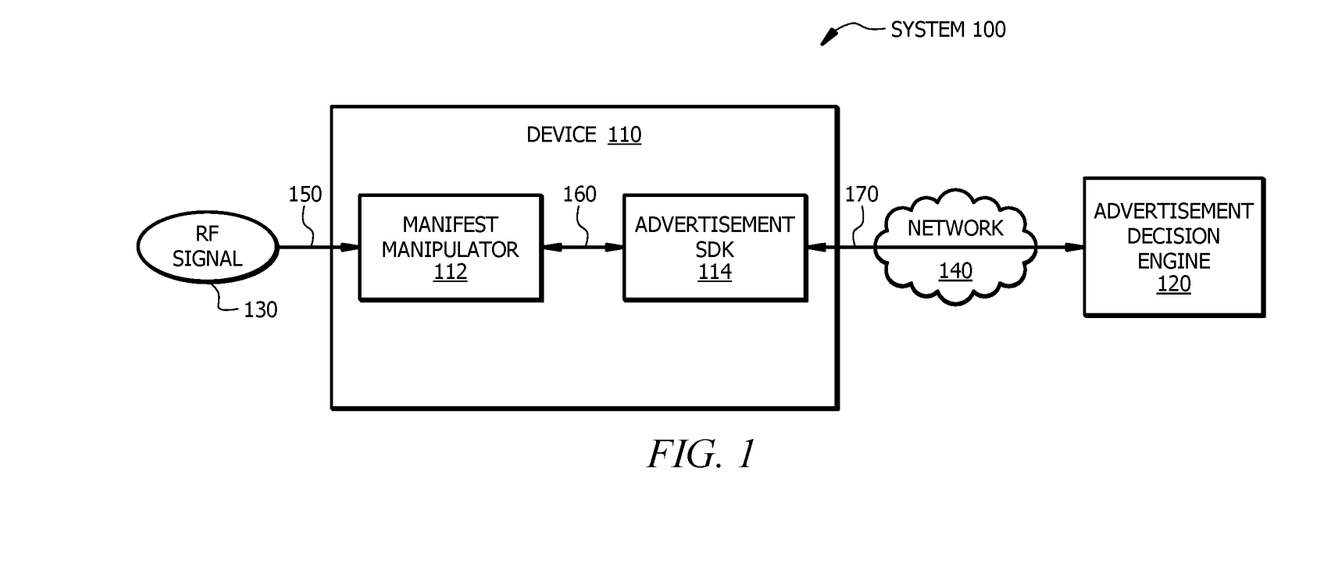
FIG. 1 illustrates an example system for inserting an advertisement into ATSC content.
Figure 2:
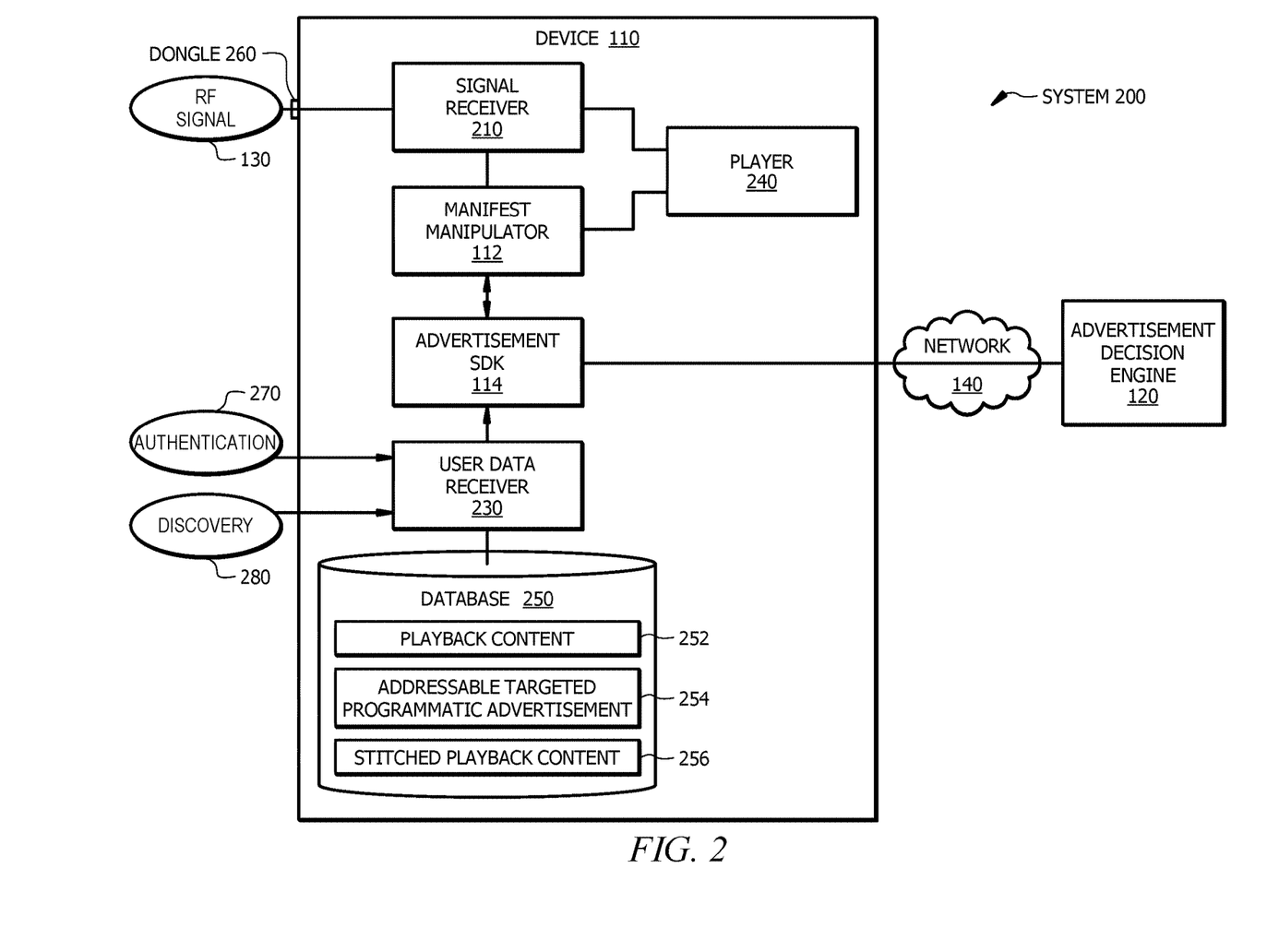
FIG. 2 illustrates an example system for inserting an advertisement into ATSC content that may be used by the system of FIG. 1.
Figure 3:
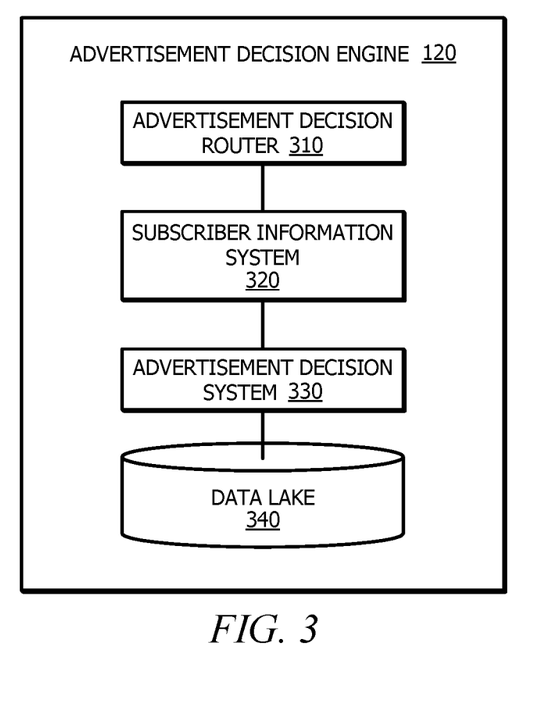
FIG. 3 illustrates an example advertisement decision engine that may be used by the systems of FIGS. 1 and 2.
Figure 4:
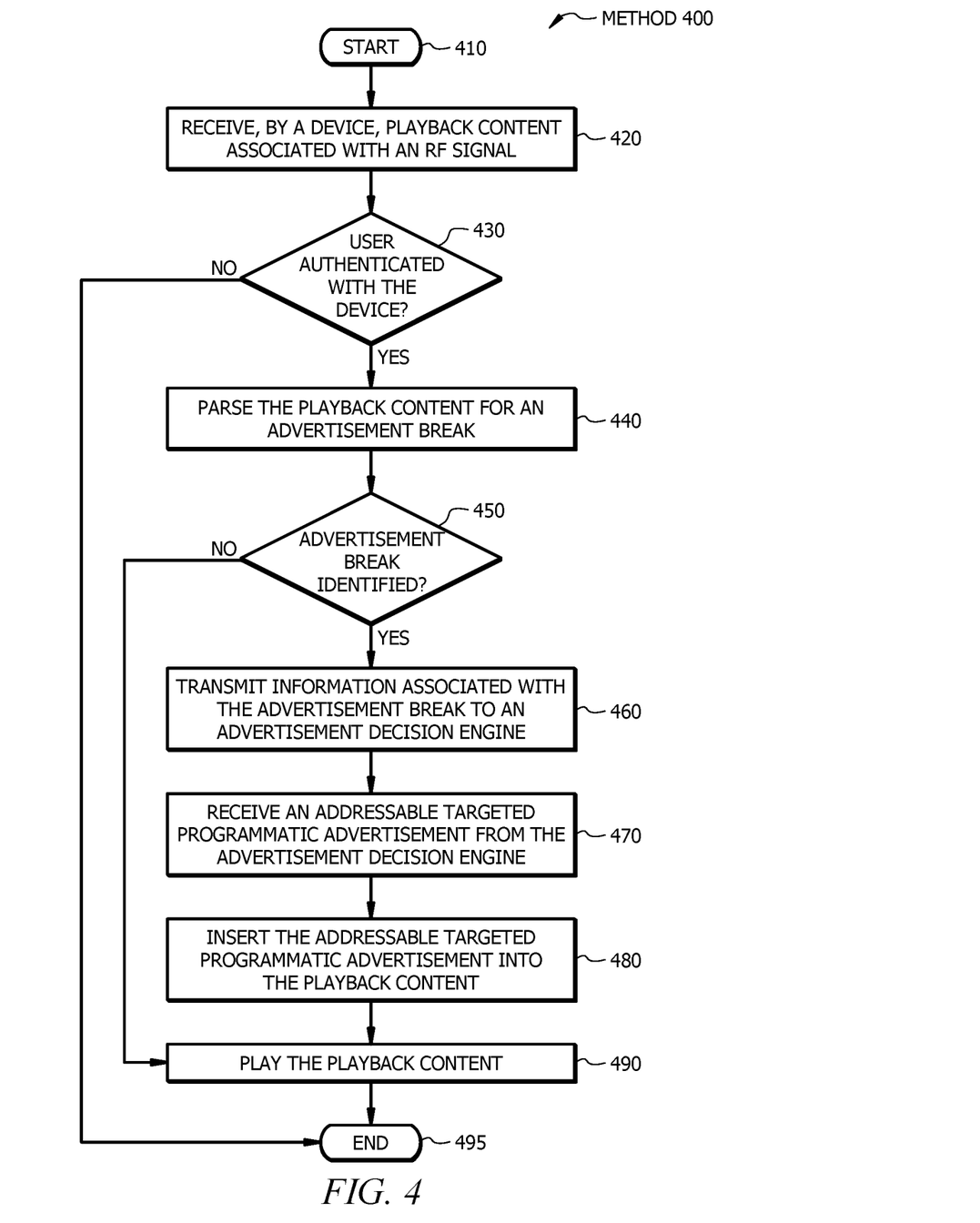
FIG. 4 illustrates an example method for inserting an advertisement into ATSC content.
Figure 5:
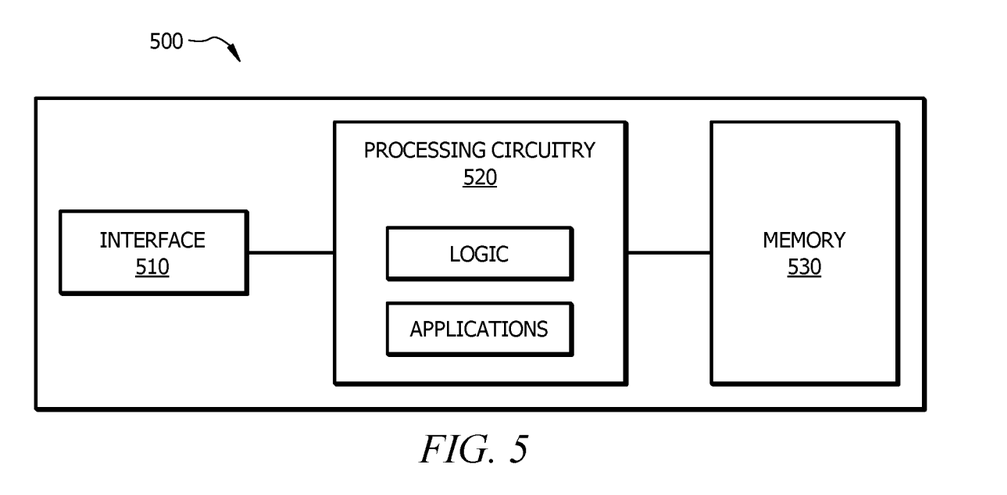
FIG. 5 illustrates an example computer system that may be used by the systems and methods described herein.

FIGS. 1 through 5 show example systems and methods for inserting an advertisement into ATSC content. FIG. 1 shows an example system for inserting an advertisement into ATSC content, and FIG. 2 shows more detailed system for inserting an advertisement into ATSC content that may be used by the system of FIG. 1. FIG. 3 shows an example advertisement decision engine that may be used by the systems of FIGS. 1 and 2. FIG. 4 shows an example method for inserting an advertisement into ATSC content. FIG. 5 shows an example computer system that may be used by the systems and methods described herein.

FIG. 1 illustrates an example system 100 for inserting an advertisement into ATSC content. System 100 of FIG. 1 includes a device 110 and an advertisement decision engine 120. Device 110 is any component that can receive content associated with a radio frequency (RF) signal (e.g., an ATSC 3.0 signal). Device 110 may be an over-the-top device (OTT). Examples of OTT devices include an Apple TV, a FireStick, and a Roku device. Device 110 may be a set-top box (STB). Examples of STBs include a cable converter box, a TV signal source, a professional STB, a hybrid STB, and an Internet Protocol TV (IPTV). Device 110 may be a television (e.g., a smart TV), a desktop computer, or a mobile device (e.g., a mobile phone, a laptop computer, or a tablet). Device 110 may include an iOS or Android operating system.

Device 110 may receive one or more RF signals 130 from a source external to device 110. For example, a local television station may deliver local news channels over-the-air (OTA) using RF signal 130, and device 110 may receive RF signal 130 from the local television station. RF signal 130 may be an ATSC 3.0 signal transmitted from a content provider (e.g., a local broadcaster) that includes SCTE-35 triggers to signal advertisement insertion opportunities. RF signal 130 streams content that may be delivered in sections using International Organization for Standardization (ISO) Base Media File Format (ISO BMFF) as content format for advertisement insertion.

Device 110 may use an outdoor or indoor antenna to receive RF signal 130. The outdoor antenna may be mounted on a rooftop to provide a sufficient line of site to receive RF signal 130 from a broadcast tower. An indoor antenna may be used by residents residing near a broadcast tower or by residents living in cities or apartments where mounting an outdoor antenna is not an option. Indoor antennas are smaller than outdoor antennas and may be discreetly placed in any room of the residence. Upon receiving RF signal 130, the outdoor or indoor antenna may deliver RF signal 130 to a receiver of device 110. The receiver may be a dedicated receiver located within device 110 or a dongle connected to device 110.

Device 110 includes a manifest manipulator 112 and an advertisement software development kit (SDK) 114. Manifest manipulator 112 is a computer program that inserts one or more advertisements in playback content generated from RF signal 130 (e.g., an ATSC 3.0 signal). Manifest manipulator 112 may request playback content from a receiver of the device and parse the playback content for markers (e.g., SCTE-35 markers). The markers may include dynamic adaptive streaming over HTTP (DASH) periods, adaptations sets (i.e., sets of representations containing interchangeable versions of the content such as resolutions and bitrates), segment timelines (e.g., a synchronization timeline), and so forth. Manifest manipulator 112 may utilize Moving Picture Experts Group (MPEG)-DASH ISO base media file format. Manifest manipulator 112 may receive a DASH-Industry Forum (DASH-IF) ATSC Main Media Presentation that conforms to ISO BMFF Broadcast TV Profile.

Manifest manipulator 112 may insert addressable targeted programmatic advertisements received from advertisement SDK 114 into the playback content. An addressable targeted programmatic advertisement is an advertisement that is selected based on attributes (e.g., demographic, psychographic, and/or behavioral attributes) associated with device 110 and/or a user of device 110. The addressable targeted programmatic advertisement is addressable in that an end point (e.g., device 110) that serves the addressable targeted programmatic advertisement is operable to render the addressable targeted programmatic advertisement independently of any other end points based on attributes specific to device 110 and/or a user of device 110.

Advertisement SDK 114 is a software development kit that receives advertisement requests from manifest manipulator 112 and transmits addressable targeted programmatic advertisements to manifest manipulator 112 in response to the request. Advertisement SDK 114 may be an interface library to manifest manipulator 112 and advertisement decision engine 120. Advertisement SDK 114 may accept one or more advertisement requests from manifest manipulator 112, which may include a channel identification, an advertisement break identification, and an advertisement break duration. Advertisement SDK 114 may append addressability parameters, such as a device advertising identification, a user identification, a device identification, and a device location to the advertisement request. Advertisement SDK 114 may transmit the appended advertisement request to advertisement decision engine 120 and receive a response with one or more addressable targeted programmatic advertisements from advertisement decision engine 120. The received addressable targeted programmatic advertisements may be in the form of URLs. Advertisement SDK 114 may transmit the URLs to manifest manipulator 112 to insert into the playback content. Whenever the advertisement is played by a player of device 110, advertisement SDK 114 tracks advertisement impressions by firing corresponding advertisement impression beacons to advertisement decision engine 120 based on the timed metadata (e.g., an Event Message Box (EMSG) event) received from the player of device 110. Advertisement SDK 114 may communicate with advertisement decision engine 120 in accordance with the Video Ad Serving Template (VAST) specification.

Advertisement decision engine 120 is any system that can select advertisements based on information received from device 110. Advertisement decision engine 120 may select one or more addressable targeted programmatic advertisements to be inserted into playback content stored in device 110. Advertisement decision engine 120 may select addressable targeted programmatic advertisements based on a household profile, a user profile (e.g., a device advertisement identification), and various demographic criteria such as age, income, interests, buying habits, and a location of a user of device 110. Advertisement decision engine 120 is discussed in more detail in FIG. 3 below.

Network 140 may be any type of network that facilitates communication between components of system 100. Network 140 may connect device 110 and advertisement decision engine 120 of system 100. In the illustrated embodiment, network 140 is a connection through the Internet. Although this disclosure shows network 140 as being a particular kind of network, this disclosure contemplates any suitable network. One or more portions of network 140 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. Network 140 may include one or more networks. Network 140 may be any communications network, such as a private network, a public network, a mobile network, a WI-FI network, etc. One or more components of system 100 may communicate over network 140. For example, device 110 may communicate over network 140, including transmitting information to advertisement decision engine 120 and receiving information from advertisement decision engine 120.

Although FIG. 1 illustrates a particular arrangement of device 110, manifest manipulator 112, advertisement SDK 114, advertisement decision engine 120, RF signal 130, and network 140, this disclosure contemplates any suitable arrangement of device 110, manifest manipulator 112, advertisement SDK 114, advertisement decision engine 120, RF signal 130, and network 140. Two or more of device 110, manifest manipulator 112, advertisement SDK 114, and advertisement decision engine 120 may be physically or logically co-located with each other in whole or in part. Although FIG. 1 illustrates a particular number of devices 110, manifest manipulators 112, advertisement SDKs 114, advertisement decision engines 120, RF signals 130, and networks 140, this disclosure contemplates any suitable number of devices 110, manifest manipulators 112, advertisement SDKs 114, advertisement decision engines 120, RF signals 130, and networks 140. For example, system 100 may include multiple devices 110 and multiple advertisement decision engines 120.

In operation, a local television station delivers a local news channel OTA using RF signal 130 (e.g., an ATSC 3.0 signal). An outdoor antenna receives RF signal 130 and delivers (see notation 150) RF signal 130 to a dongle attached to device 110. The dongle converts RF signal 130 to playback content. A receiver of device 110 receives RF signal 130 from the dongle. Manifest manipulator 112 requests playback content from the receiver and identifies STCE-35 markers in the playback content by parsing the playback content for DASH periods and other information. Manifest manipulator 112 requests (see notation 160) one or more addressable targeted programmatic advertisements from advertisement SDK 114, which acts as an interface library to manifest manipulator 112 and advertisement decision engine 120. The request includes a channel identification, an advertisement break identification, and an advertisement break duration. Advertisement SDK 114 appends addressability parameters to the request, such as a device advertising identification, a user identification, a device identification, and a device location and transmits (see notation 170) the appended request to advertisement decision engine 120 using network 140. Advertisement decision engine 120 selects an addressable targeted programmatic advertisement based in part on information received from advertisement SDK 114 and transmits (see notation 170) the addressable targeted programmatic advertisement to advertisement SDK 114, which transmits (see notation 160) the addressable targeted programmatic advertisement to manifest manipulator 112. Manifest manipulator 112 inserts the addressable targeted programmatic advertisement into the playback content and transmits the stitched playback content to a player of device 110.

As such, system 100 of FIG. 1 seamlessly inserts addressable targeted programmatic advertisements into ATSC 3.0 content, which may increase the device user's experience by providing advertisements that are targeted to the user without a noticeable delay.

FIG. 2 illustrates an example system 200 for inserting an advertisement into ATSC content that may be used by the system of FIG. 1. System 200 includes device 110 and advertisement decision engine 120. Device 110 includes a signal receiver 210 (e.g., an ATSC 3.0 signal receiver), manifest manipulator 112, advertisement SDK 114, a user data receiver 230, a player 240, a database 250, and a dongle 260. Database 250 stores playback content 252, addressable targeted programmatic advertisements 254, and stitched playback content 256.

Signal receiver 210 of device 110 represents any suitable computer element that can collect broadcast transmission (e.g., RF signal 130). Signal receiver 210 may receive information from one or more components of system 200, transmit information to one or more components of system 200, perform suitable processing of the information, communicate to other components (e.g., manifest manipulator 112, player 240, and dongle 260) of system 100, or any combination of the preceding. Signal receiver 210 may collect broadcast transmission (e.g., an ATSC 3.0 stream) from an antenna and/or dongle 260. Signal receiver 210 may receive playback content 252 (e.g., playlist manifest and media files) from dongle 260. Signal receiver 210 may store video segments associated with RF signal 130 in a cache memory. Signal receiver 210 may act as a local server to manifest manipulator 112 and player 240. Signal receiver 210 acts as a proxy that buffers incoming packets associated with RF signal 130 for a certain period of time (e.g., 1000 milliseconds). This allows manifest manipulator 112 to seamlessly insert addressable targeted programmatic advertisements 254 into playback content 252 during that buffer time without the user of device 110 experiencing a delay.

User data receiver 230 of device 110 represents any suitable computer element that can receive information associated with device 110. User data receiver 230 may receive information from one or more components of system 200, transmit information to one or more components of system 200, perform suitable processing of the information, communicate to other components (e.g., advertisement SDK 114) of system 100, or any combination of the preceding.

User data receiver 230 may receive discovery information 280. Discovery information 280 may include a device identification (e.g., a distinctive number associated with device 110), an electronic program guide (EPG), a universally unique identifier (UUID), a device advertising identification (e.g., a unique, user-resettable identification for advertising), and a device location. The EPG indicates which channels are available to a user of device 110. For example, the EPG may indicate which local channels will be available when dongle 260 is attached to device 110. Discovery information 280 may be acquired by user data receiver 230 each time device 110 is turned on.

User data receiver 230 may receive authentication information 270. Authentication information 270 includes a user identification. The authentication process either grants or denies a user of device 110 access to content (e.g., playback content 252). In the event of authentication failure, an error message is provided to the user of device 110. In the event the user is authenticated, user data receiver 230 may receive the user identification. In certain embodiments, user data receiver 230 only receives discovery information 280 (e.g., the device identification, the EPG, the UUID, the device advertising identification, and/or the device location) if the user is authenticated with device 110. The authentication process may be initiated upon activation of device 110. User data receiver 230 may transmit these parameters (e.g., the device identification, the user identification, the device advertising identification, and the device location) to advertisement SDK 114.

Player 240 of device 110 is any computer element suitable for playback of ATSC 3.0 content. Player 240 requests and receives playback content 252 with one or more stitched addressable targeted programmatic advertisement URLs from manifest manipulator 112. Using the URLs, player 240 downloads the corresponding addressable targeted programmatic advertisements from the Internet. Player 240 plays stitched playback content 256. After stitched playback content 256 is played, player 240 may provide analytics events (e.g., a timed metadata event such as an EMSG event) to advertisement SDK 114.

Database 250 of device 110 is any component that can store data associated with system 200. Database 250 may store certain types of information. Database 250 may be a single database or may include multiple databases. Database 250 stores playback content 252, addressable targeted programmatic advertisements 254, and stitched playback content 256 (i.e., playback content 252 with one or more inserted addressable targeted programmatic advertisements 254). Database 250 includes any one or a combination of volatile or non-volatile local or remote devices suitable for storing information. Database 250 may include Random Access Memory (RAM), Read-Only memory (ROM), magnetic storage devices, optical storage devices, or any other suitable information storage device or a combination of these devices. Although database 250 is shown within device 110 of FIG. 2, database 250 may be located in any location suitable for communication with device 110. Database 250 may be external to device 110, such as in a cloud environment. Although described as a database, database 250 may be implemented as any suitable type of volatile or non-volatile memory. Database 250 may include one or more interfaces and/or processors.

Dongle 260 is a small component (e.g., a small stick approximately the size of a USB flash drive) that is connected to device 110 to provide device 110 with additional functionality. Dongle 260 provides device 110 access to RF signal 130. Dongle 260 may plug into a High-Definition Multimedia Interface (HDMI) port of device 110. Dongle 260 may enable device 110 to display content. Dongle 260 (e.g., an OTA dongle) may include an ATSC tuner. The ATSC tuner of dongle 260 may provide one or more of the following functions: selective tuning, demodulation, transport stream demultiplexing, decompression, error correction, analog-to-digital conversion, and so forth. The ATSC tuner of dongle 260 operates by generating audio and video signals that are picked up by dongle 260 from OTA broadcast television (e.g., an ATSC 3.0 signal). Dongle 260 allows users of device 110 to view local channels (e.g., ASTC 3.0 channels) on a device (e.g., a mobility device such as a cell phone or tablet). Dongle 260 may include a cache memory to temporarily store and handle playback content 252, such as media presentation description (MPD). Certain embodiments may use a built-in OTA receiver that supports receipt of RF signal 130 in place of or in addition to dongle 260.

In an embodiment of system 200, an operating system (e.g., iOS or Android) of device 110 receives discovery information 280 (e.g., a device identification, EPG information, a device advertising identification, and/or a device location) when device 110 is turned on. The operating system authenticates a user of device 110 using the device identification. In response to authentication 270 of the user to device 110, the operating system of device 110 receives a user identification. User data receiver 230 receives the user identification, the device identification, the device advertising identification, and the device location from the operating system and transmits this information to advertisement SDK 114 of device 110. Signal receiver 210 of device 110 detects dongle 260 and tunes to an OTA channel identified from the EPG. Dongle 260 receives RF signal 130 (e.g., an ATSC 3.0 signal) from an RF stream (e.g., an ATSC 3.0 stream), and signal receiver 210 receives information associated with the RF stream from dongle 260.

The following steps of the embodiment of system 200 may occur in a loop. Player 240 of device 110 requests playback content 252 from manifest manipulator 112 of device 110. Manifest manipulator 112 requests and receives playback content 252 from signal receiver 210. Player 240 receives playback content 252 from manifest manipulator 112 if manifest manipulator 112 determines that playback content 252 does not have an advertisement break. Otherwise, manifest manipulator 112 identifies the advertisement periods from the MPD of playback content 252 and transmits a request for targeted advertisements to advertisement SDK 114. The advertisement request includes a channel identification, an advertisement break identification, and an advertisement break duration.

Advertisement SDK 114 appends the advertisement request with the user identification, the device identification, the device advertising identification, and the device location received from user data receiver 230 and transmits the appended advertisement request to advertisement decision engine 120. Advertisement decision engine 120 selects addressable targeted programmatic advertisements 254 based on the information provided by advertisement SDK 114. Advertisement SDK 114 receives a VAST response with selected addressable targeted programmatic advertisements 254 from advertisement decision engine 120, extracts URLs and advertisement impression beacons (i.e., invisible images used to count each advertisement view) from the response, and transmits the extracted URLs to manifest manipulator 112. Manifest manipulator 112 adds addressable targeted programmatic advertisements 254 to the advertisement periods in playback content 252 to create stitched playback content 256. Player 240 retrieves stitched playback content 256 from manifest manipulator 112. Player 240 decodes the MPD and downloads playback content 252 from signal receiver 210. Player 240 retrieves addressable targeted programmatic advertisements 254 from the Internet and plays the retrieved selected addressable targeted programmatic advertisements 254. Advertisement SDK 114 receives time metadata when player 240 plays the retrieved selected addressable targeted programmatic advertisements 254 and communicates beacons to advertisement decision engine 120 each time the retrieved addressable targeted programmatic advertisements 254 are played to manage advertisement impression reporting. This loop may repeat every few seconds (e.g., every six seconds).

Modifications, additions, or omissions may be made to the steps of this embodiment. These steps may be performed in parallel or in any suitable order by any suitable component. Advertisement decision engine 120 of FIG. 2 is discussed in more detail in FIG. 3 below.

Although FIG. 2 illustrates a particular arrangement of device 110, manifest manipulator 112, advertisement SDK 114, advertisement decision engine 120, RF signal 130, network 140, signal receiver 210, user data receiver 230, player 240, database 250, dongle 260, authentication information 270, and discovery information 280, this disclosure contemplates any suitable arrangement of device 110, manifest manipulator 112, advertisement SDK 114, advertisement decision engine 120, RF signal 130, network 140, signal receiver 210, user data receiver 230, player 240, database 250, dongle 260, authentication information 270, and discovery information 280. Although FIG. 2 illustrates a particular number of devices 110, manifest manipulators 112, advertisement SDKs 114, advertisement decision engines 120, ATSC 3.0 signals 130, networks 140, signal receivers 210, user data receivers 230, players 240, databases 250, and dongles 260, this disclosure contemplates any suitable number of devices 110, manifest manipulators 112, advertisement SDKs 114, advertisement decision engines 120, ATSC 3.0 signals 130, networks 140, signal receivers 210, user data receivers 230, players 240, databases 250, and dongles 260. For example, system 100 may include multiple devices 110 and multiple advertisement decision engines 120.

FIG. 3 illustrates an example advertisement decision engine 120 that may be used by the systems of FIGS. 1 and 2. Advertisement decision engine 120 selects one or more addressable targeted programmatic advertisements based on information received from a device (e.g., device 110 of FIG. 1). Advertisement decision engine 120 includes an advertisement decision router 310, a subscriber information system 320, an advertisement decision system 330, and a data lake 340.

Advertisement decision router 310 of advertisement decision engine 120 is any computer element that can route data from one location to a different location. Advertisement decision router 310 may be a wireless router, a wired router, a core router, an edge router, or a virtual router. Advertisement decision router 310 may be a networking device that serves as an intermediator between an advertisement SDK (e.g., advertisement SDK 114 of FIG. 1), subscriber information system 320, and advertisement decision system 330. Advertisement decision router 310 uses parameters transmitted by the advertisement SDK to gather specific user segments from subscriber information system 320 and transmits the specific user segments to advertisement decision system 330 as part of the advertisement requests. Advertisement decision router 310 may route advertisement placement requests to one or more advertisement decision systems 330 based on various requirements. The various requirements may include one or more of the following: an advertisement break length, an advertisement break type (e.g., national or local); a type of device; demographic criteria (e.g., income level, gender, interests, hobbies, past viewership habits, etc.) of the device user (e.g., subscriber); a type of channel currently viewed by the device (e.g., a sports network or a news network); a type of content currently viewed by the device; a type of program currently viewed by the device; and a time of day the content is viewed.

Subscriber information system 320 of advertisement decision engine 120 stores audience segment information based on a subscriber profile (e.g., a profile of a user of device 110 of FIG. 1). Subscriber information system 320 receives parameters such as a user identification from advertisement decision router 310, collects subscriber information based on the user identification, and transfers the subscriber information to advertisement decision router 310. Subscriber information system 320 may request and receive specific user segments from data lake 340 and transfer the user segments to advertisement decision router 310.

Advertisement decision system 330 of advertisement decision engine 120 is a decision system for addressable targeted programmatic advertisements. Advertisement decision system 330 selects the best advertisements based on advertisement requests received from advertisement decision router 310 and most recent information from a campaign management system (i.e., a system that measures elements and individual components of a marketing campaign). Advertisement decision system 330 sends addressable targeted programmatic advertisement URLs as per each advertisement request to advertisement decision router 310. Advertisement decision system 330 may send the URLs via a VAST response.

Data lake 340 is a storage repository that stores user profiles (e.g., a profile of a user of device 110 of FIG. 1). Upon request, data lake 340 provides specific user segments to subscriber information system 320 and/or advertisement decision system 330. Data lake 340 may be any component that can store data. Data lake 340 may be a single database or may include multiple databases. Data lake 340 includes any one or a combination of volatile or non-volatile local or remote devices suitable for storing information. Data lake 340 may include RAM, ROM, magnetic storage devices, optical storage devices, or any other suitable information storage device or a combination of these devices. Although Data lake 340 is shown within advertisement decision engine 120 of FIG. 3, data lake 340 may be located in any location suitable for communication with device 110. Data lake 340 may be external to device 110, such as in a cloud environment. Data lake 340 may be implemented as any suitable type of volatile or non-volatile memory. Data lake 340 may include one or more interfaces and/or processors.

In an embodiment, advertisement decision router 310 receives an advertisement request from an advertisement SDK (e.g., advertisement SDK 114 of FIG. 1 or 2). Advertisement decision router 310 identifies a subscriber (e.g., a user of device 110 of FIG. 1 or 2) from the received advertisement request and requests subscriber data from subscriber information system 320. Subscriber information system 320 requests and receives user segment information from data lake 340. Data lake 340 provides the targeted user segment for the advertisement campaign to advertisement decision system 330. Advertisement decision router 310 receives subscriber data from subscriber information system 320 and transmits the advertisement request to advertisement decision system 330 based on the user's targeted attributes. The advertisement request may be transmitted in accordance with the VAST specification. Advertisement decision system 330 selects one or more addressable targeted programmatic advertisements 254. Advertisement decision router 310 receives, via a VAST response, the selected addressable targeted programmatic advertisements 254, which are accessed by the advertisement SDK. The steps of this embodiment may occur as part of the loop discussed in FIG. 2 above. Modifications, additions, or omissions may be made to these steps. These steps may be performed in parallel or in any suitable order by any suitable component.

Although FIG. 3 illustrates a particular arrangement of advertisement decision engine 120, advertisement decision router 310, subscriber information system 320, advertisement decision system 330, and data lake 340, this disclosure contemplates any suitable arrangement of advertisement decision engine 120, advertisement decision router 310, subscriber information system 320, advertisement decision system 330, and data lake 340. Although FIG. 3 illustrates a particular number of advertisement decision engines 120, advertisement decision routers 310, subscriber information systems 320, advertisement decision systems 330, and data lakes 340, this disclosure contemplates any suitable number of advertisement decision engines 120, advertisement decision routers 310, subscriber information systems 320, advertisement decision systems 330, and data lakes 340. For example, advertisement decision engine 120 may include multiple advertisement decision routers 310.

FIG. 4 illustrates an example method 400 for inserting an advertisement in ATSC content. Method 400 begins at step 410. At step 420, a device (e.g., device 110 of FIG. 1 or 2) receives playback content associated with an RF signal (e.g., an ATSC 3.0 signal). For example, an antenna may receive an RF signal (e.g., RF signal 130 of FIG. 1 or 2) from a television broadcast tower and deliver the signal to a dongle (e.g., dongle 260 of FIG. 2) attached to the device, and a receiver of the device may receive the playback content from the dongle.

At step 430, the device determines whether a user of the device is authenticated with the device. The authentication process either grants or denies the user access to the playback content. If the user is denied access, method 400 advances to step 495, where method 400 ends. In the case of authentication failure, an error message may be provided to the user. If the user is granted access, method 400 advances to step 440, where a manifest manipulator (e.g., manifest manipulator 112 of FIG. 2) of the device parses the playback content for one or more advertisement breaks. For example, the device may identify one or more markers (e.g., SCTE-35 markers) in the playback content and, using the identified markers, parse the playback content for DASH periods, adaptations sets, and segment lines. Method 400 then advances to step 450.

At step 450, the device determines whether an advertisement break has been identified. If an advertisement break was not identified at step 440, method 400 advances to step 450, where a player of the device plays the playback content in its original form. If an advertisement break was identified at step 450, method 400 advances to step 460, where the device transmits information associated with the advertisement break to an advertisement decision engine. For example, the manifest manipulator of the device may transmit an advertisement request to an advertisement SDK (e.g., advertisement SDK of FIG. 1 or 2) of the device that includes a channel identification, an advertisement break identification, and an advertisement break duration. The advertisement SDK may append the advertisement request with a device advertising identification, a user identification, a device identification, and a device location and transmit the appended advertisement request to the advertisement decision engine (e.g., advertisement decision engine 120 of FIG. 1 or 2). Method 400 then advances to step 470.

At step 470, the device receives an addressable targeted programmatic advertisement from the advertisement engine. The advertisement engine selects the addressable targeted programmatic advertisement based on information provided in the advertisement request. Method 470 then advances to step 480, where the device inserts the addressable targeted programmatic advertisement into the playback content to create stitched playback content. Method 400 advances from step 480 to 490, where a player of the device plays the stitched playback content. Method 400 then advances to step 490, where method 400 ends.

Modifications, additions, or omissions may be made to method 400 depicted in FIG. 4. Method 400 may include more, fewer, or other steps. For example, method 400 may exclude step 430 directed to authenticating the user with the device. As another example, step 440 directed to parsing the playback content for an advertisement break may occur prior to step 430 directed to authenticating the user with the device. Steps may also be performed in parallel or in any suitable order. While discussed as specific components completing the steps of method 400, any suitable component may perform any step of method 400.

FIG. 5 shows an example computer system that may be used by the systems and methods described herein. For example, device 110 and advertisement decision engine 120 of FIG. 1 or 2 may include one or more interface(s) 510, processing circuitry 520, memory(ies) 530, and/or other suitable element(s). Interface 510 receives input, sends output, processes the input and/or output, and/or performs other suitable operation. Interface 510 may comprise hardware and/or software.

Processing circuitry 520 performs or manages the operations of the component. Processing circuitry 520 may include hardware and/or software. Examples of a processing circuitry include one or more computers, one or more microprocessors, one or more applications, etc. In certain embodiments, processing circuitry 520 executes logic (e.g., instructions) to perform actions (e.g., operations), such as generating output from input. The logic executed by processing circuitry 520 may be encoded in one or more tangible, non-transitory computer readable media (such as memory 530). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 530 (or memory unit) stores information. Memory may comprise one or more non-transitory, tangible, computer-readable, and/or computer-executable storage media. Examples of memory 530 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
   receiving, by a device, playback content, wherein the playback content is associated with an Advanced Television Systems Committee (ATSC) signal received at an ATSC tuner of a dongle removably connected to the device, the dongle comprising a cache memory to temporarily store the playback content;
   identifying, by the device, one or more markers in the playback content;
   appending, by an advertisement software development kit (SDK) of the device, information associated with the device to an advertisement request, wherein the advertisement request comprises information associated with the one or more markers;
   communicating, by the advertisement SDK of the device, the appended advertisement request to an advertisement decision engine;
   receiving, by the device, a response from the advertisement decision engine according to the video ad serving template (VAST), wherein the SDK extracts from the response a Uniform Resource Locator (URL) for an addressable targeted programmatic advertisement and advertisement impression beacons associated with the addressable targeted programmatic advertisement; and
   inserting, by the device, the addressable targeted programmatic advertisement URL into the playback content.

2. The method of claim 1, wherein the addressable targeted programmatic advertisement is selected by the advertisement decision engine based at least in part on the information associated with the one or more markers, the information associated with the one or more markers comprising one or more of the following:
   a channel identification;
   an advertisement break identification; and
   an advertisement break duration.

3. The method of claim 1, wherein the addressable targeted programmatic advertisement is selected by the advertisement decision engine based at least in part on the information associated with the device, the information associated with the device comprising one or more of the following:
   a device identification;
   an identification of a user of the device;
   an advertising identification; and
   a location of the device.

4. The method of claim 1, wherein
   the addressable targeted programmatic advertisement URL is received by the advertisement SDK of the device.

5. The method of claim 1, wherein identifying the one or more markers in the playback content comprises parsing the playback content for one or more of the following:
   Dynamic Adaptive Streaming over HTTP (DASH) periods;
   adaptations sets; and
   segment timelines.

6. The method of claim 1, wherein:
   the ATSC signal is an ATSC 3.0 signal; and
   the one or more markers are SCTE-35 markers.

7. The method of claim 1, further comprising:
   receiving, by a DASH player of the device, an advertisement from the Internet;
   communicating, by the DASH player of the device, the advertisement received from the Internet;
   receiving, by the advertisement SDK, timed metadata from the DASH player of the device when the DASH player plays the advertisement; and
   tracking, by the advertisement SDK, advertisement impressions by communicating corresponding advertisement impression beacons in response to receiving the timed metadata.

8. A system comprising one or more processors and a memory storing instructions that, when executed by the one or more processors, cause the one or more processors to perform operations comprising:
   receiving, by a device, playback content, wherein the playback content is associated with an Advanced Television Systems Committee (ATSC) signal received at an ATSC tuner of a dongle removably connected to the device, the dongle comprising a cache memory to temporarily store the playback content;
   identifying, by the device, one or more markers in the playback content;
   appending, by an advertisement software development kit (SDK) of the device, information associated with the device to an advertisement request, wherein the advertisement request comprises information associated with the one or more markers;
   communicating, by the advertisement SDK of the device, the appended advertisement request to an advertisement decision engine;
   receiving, by the device, a response from the advertisement decision engine according to the video ad serving template (VAST), wherein the SDK extracts from the response a Uniform Resource Locator (URL) for an addressable targeted programmatic advertisement and advertisement impression beacons associated with the addressable targeted programmatic advertisement; and
   inserting, by the device, the addressable targeted programmatic advertisement URL into the playback content.

9. The system of claim 8, wherein the addressable targeted programmatic advertisement is selected by the advertisement decision engine based at least in part on the information associated with the one or more markers, the information associated with the one or more markers comprising one or more of the following:
   a channel identification;
   an advertisement break identification; and
   an advertisement break duration.

10. The system of claim 8, wherein the addressable targeted programmatic advertisement is selected by the advertisement decision engine based at least in part on the information associated with the device, the information associated with the device comprising one or more of the following:
- a device identification;
- an identification of a user of the device;
- an advertising identification; and
- a location of the device.

11. The system of claim 8, wherein the addressable targeted programmatic advertisement URL is received by the advertisement SDK of the device.

12. The system of claim 8, wherein identifying the one or more markers in the playback content comprises parsing the playback content for one or more of the following:
- DASH periods;
- adaptations sets; and
- segment timelines.

13. The system of claim 8, wherein:
- the ATSC signal is an ATSC 3.0 signal; and
- the one or more markers are SCTE-35 markers.

14. The system of claim 8, the operations further comprising:
- receiving, by a DASH player of the device, an advertisement from the Internet;
- communicating, by the DASH player of the device, the advertisement received from the Internet;
- receiving, by the advertisement SDK, timed metadata from the DASH player of the device when the DASH player plays the advertisement; and
- tracking, by the advertisement SDK, advertisement impressions by firing corresponding advertisement impression beacons in response to receiving the timed metadata.

15. One or more computer-readable non-transitory storage media embodying instructions that, when executed by a processor, cause the processor to perform operations comprising:
- receiving, by a device, playback content, wherein the playback content is associated with an Advanced Television Systems Committee (ATSC) signal received at an ATSC tuner of a dongle removably connected to the device, the dongle comprising a cache memory to temporarily store the playback content;
- identifying, by the device, one or more markers in the playback content;
- appending, by an advertisement software development kit (SDK) of the device, information associated with the device to an advertisement request, wherein the advertisement request comprises information associated with the one or more markers;
- communicating, by the advertisement SDK of the device, the appended advertisement request to an advertisement decision engine;
- receiving, by the device, a response from the advertisement decision engine according to the video ad serving template (VAST), wherein the SDK extracts from the response a Uniform Resource Locator (URL) for an addressable targeted programmatic advertisement and advertisement impression beacons associated with the addressable targeted programmatic advertisement; and
- inserting, by the device, the addressable targeted programmatic advertisement URL into the playback content.

16. The one or more computer-readable non-transitory storage media of claim 15, wherein the addressable targeted programmatic advertisement is selected by the advertisement decision engine based at least in part on the information associated with the one or more markers, the information associated with the one or more markers comprising one or more of the following:
- a channel identification;
- an advertisement break identification; and
- an advertisement break duration.

17. The one or more computer-readable non-transitory storage media of claim 15, wherein the addressable targeted programmatic advertisement is selected by the advertisement decision engine based at least in part on the information associated with the device, the information associated with the device comprising one or more of the following:
- a device identification;
- an identification of a user of the device;
- an advertising identification; and
- a location of the device.

18. The one or more computer-readable non-transitory storage media of claim 15, wherein the addressable targeted programmatic advertisement URL is received by the advertisement SDK of the device.

19. The one or more computer-readable non-transitory storage media of claim 15, wherein identifying the one or more markers in the playback content comprises parsing the playback content for one or more of the following:
- DASH periods;
- adaptations sets; and
- segment timelines.

20. The one or more computer-readable non-transitory storage media of claim 15, wherein:
- the ATSC signal is an ATSC 3.0 signal; and
- the one or more markers are SCTE-35 markers.

* * * * *